April 27, 1937.  M. A. SMITH, JR., ET AL  2,078,616
REMOTE MEASURING DEVICE
Filed Oct. 14, 1933  2 Sheets-Sheet 1
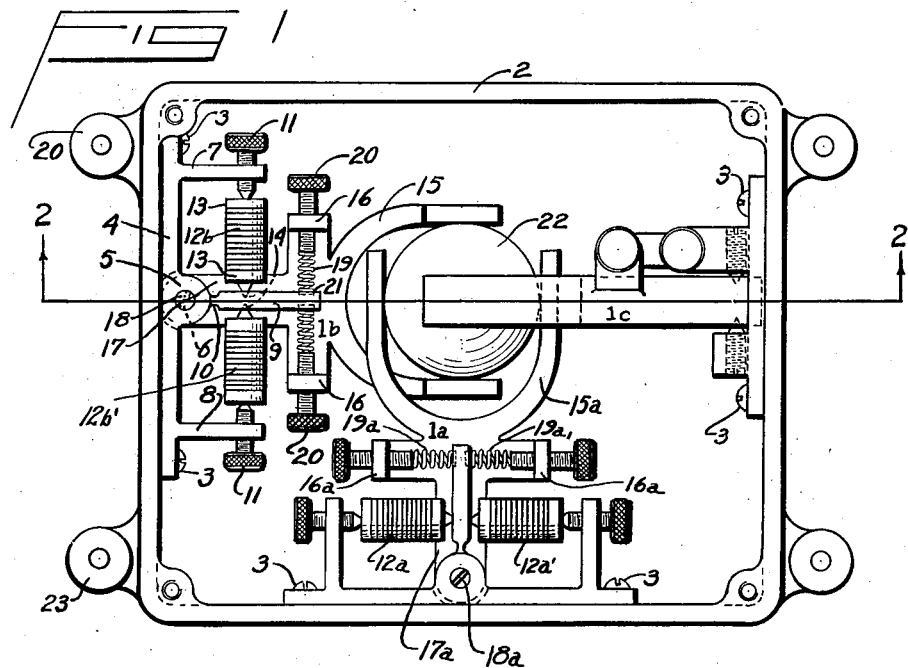
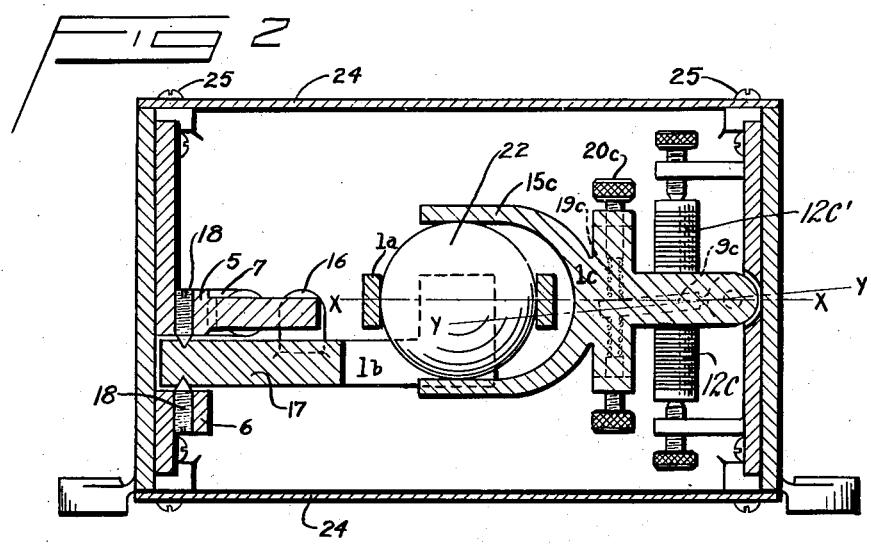
INVENTORS
MARSHALL A. SMITH, JR.
FORD L. PRESCOTT
BY
ATTORNEYS

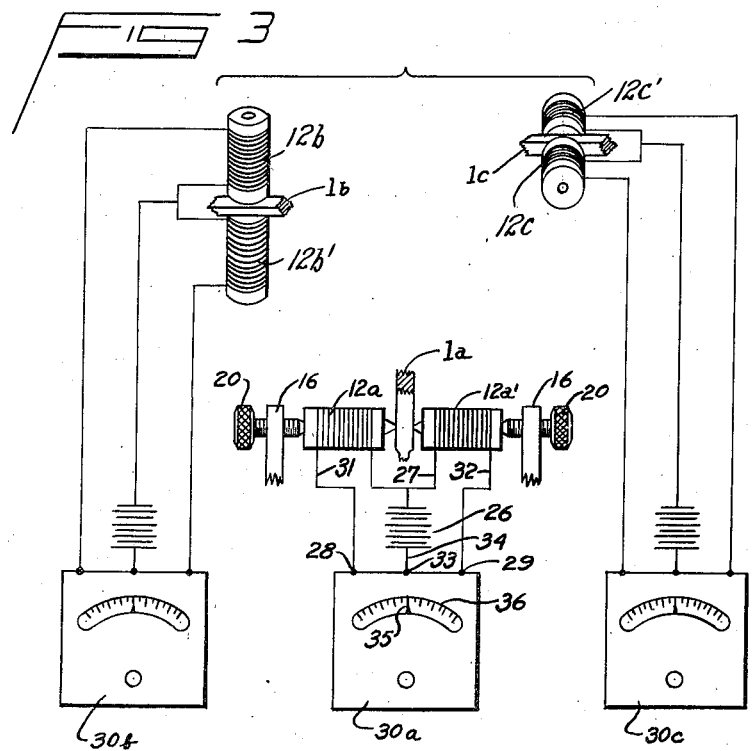

Patented Apr. 27, 1937

2,078,616

UNITED STATES PATENT OFFICE 2,078,616

REMOTE MEASURING DEVICE

Marshall A. Smith, Jr., South Bend, Ind., and Ford L. Prescott, Dayton, Ohio

Application October 14, 1933, Serial No. 693,688

4 Claims. (Cl. 177—351)

This invention relates to an instrument for measuring the acceleration of a body or for indicating the amplitude and frequency of any vibrations existing therewithin.

It is an object of our invention to provide an instrument having its indicating element remotely located from the body to which the measuring element is attached.

It is another object of our invention to provide an instrument which will indicate the amplitude of oscillation of a body at a point remote therefrom.

It is a further object of our invention to provide an instrument which will simultaneously indicate the amplitude and frequency of oscillation of a body at a point remote therefrom.

It is a still further object of our invention to provide an instrument which will give simultaneous indications of oscillatory motion of a body in any combination of planes, indicating such combined motion at a point remotely located from said body.

Another object of our invention is to indicate the magnitude of acceleration of a moving or oscillating body at a point remote therefrom.

With the foregoing and other objects in view, which will appear as the description proceeds, our invention consists in certain new and novel improvements in instruments for measuring acceleration of a body or for indicating the amplitude and frequency of any vibration existing therewithin, which will be hereinafter more fully illustrated and described in the accompanying drawings and more particularly pointed out in the appended claims.

Referring to the drawings, in which numerals of like character designate similar parts throughout the several views:

Fig. 1 shows a plan view of the measuring element of our invention.

Fig. 2 is a cross sectional view of Fig. 1 on the line 2—2.

Fig. 3 is a diagrammatic representation of the method of connecting the measuring and indicating elements of our invention.

In Figs. 1 and 2, three measuring units 1a, 1b, and 1c are fixedly attached to a frame 2 by means of screws 3. Each measuring unit 1 comprises a base 4, having bearing screw lugs 5 and 6 and outwardly extending portions 7 and 8. The outermost surface of the bearing screw lug 5 is extended to form a tongue 9, the base of which terminates in a necked down portion 10. The portions 7 and 8 are provided with set screws 11, which are adapted for securing carbon piles 12 and insulators 13 under varying degrees of pressure against recesses 14 provided in the tongue 9. A movable frame, consisting of a driving fork 15, set screw lugs 16 and an arm 17, is pivotally attached to the base 4 by means of the bearing screws 18. The lugs 16 are held in adjustable and yieldable engagement with the outer portion of the tongue 9 by means of compression spring 19, pivotally secured to the inner ends of set screws 20 and recesses 21 provided in the tongue 9. It is thus possible to initially position the axis of symmetry X—X of the driving fork 15c in the true horizontal by downward adjustment of the set screw 20c. The resulting load in the compression spring 19c is just sufficient to counteract the static load of the spherical weight 22 and driving fork 15c. It will be noted that the axis of symmetry Y—Y of the tongue 9 has been deflected downwardly. The compression springs 19 also reduce excessive wear in all of the insulators 13.

A spherical weight 22 of diameter just sufficient to freely slidably engage both prongs of the forked portion 15 of the measuring unit 1 is provided. The frame 2 is provided with mounting lugs 23 and cover plates 24, which latter plates are secured to the frame 2 by means of the screws 25.

Let it be assumed that the measuring element shown in Figs. 1 and 2 is fixedly attached to a body such that oscillations of that body will occur in a single direction coinciding with the axis of symmetry of the measuring unit 1b, which will hereinafter be referred to as "longitudinal oscillations". The driving forks 15 of the measuring units 1b and 1c are so constructed and arranged that they offer negligible resistance to longitudinal movement of the weight 22. Such weight movement is restricted, however, by the measuring element 1a, through interconnection of the driving fork 15 with the tongue 9 and the tongue 9 with the base 4. In a similar manner oscillations in a direction coinciding with the axis of symmetry of the measuring element 1a are measured by the measuring unit 1b and will hereafter be referred to as "lateral oscillations". Oscillations in a direction normal to both of the aforementioned axes of symmetry are measured by the measuring unit 1c and will hereafter be referred to as "vertical oscillations".

Each of the three measuring units operates in an identical manner. Referring to Fig. 1, let it be assumed that the measuring element of our invention is subjected to sudden longitudinal movement to the right. The frame 2, all of the parts of the measuring units 1b and 1c, and the base 4 and set screws 11 of the measuring unit 1a will be carried a corresponding distance to the right, while the spherical weight 22 will momentarily tend to remain stationary, thereby bringing about counterclockwise rotation of the driving fork 15a, lugs 16a and arm 17a about the bearing screws 18a. The aforementioned rotation will bring increased initial pressure in the compression spring 19a, causing the tongue 9 to increase initial pressure in the carbon piles 12b' and correspondingly release similar pressure in the carbon piles 12a.

Fig. 3 shows the manner in which the carbon piles 12a and 12a' are connected to one of several types of indicating and recording instruments applicable to our invention. The inner discs of the carbon piles 12a and 12a' are interconnected with a common terminal of a battery 26 by means of the electrical conduit 27, while the outer discs thereof are interconnected with terminals 28 and 29 of an ammeter 30a by means of electrical conduits 31 and 32. The other terminal of the battery 26 is connected to a terminal 33 of the ammeter 30a by means of an electrical conduit 34. With the measuring unit 1a at rest, an indicating needle 35 is brought to the midpoint of a scale graduation 36 of the ammeter 30a, through suitable manual adjustment of the set screws 20. It is thus possible, by reference to the indicating needle 35, to detect longitudinal oscillations in a body to which our measuring element has been secured. It is similarly possible, through suitable composition of the scale graduation 36, to ascertain direction and magnitude of longitudinal accelerations to which a body bearing our measuring element may be subjected.

It will be readily apparent from the above disclosure that various indicating instrument substitutions, such as that of three suitable oscillographs for the ammeters 30a, 30b, and 30c shown in Fig. 3, may be made without departing from the spirit and scope of our invention or in sacrificing any of its material advantages, the form hereinabove described being merely a present preferred embodiment of our invention.

What we claim as new and desire to secure by Letters Patent is:

1. In an instrument adapted to be secured to a body whose motion is under observation, a frame, three measuring units mounted therewithin, said measuring units comprising bases pivotally supporting three forks normal to their face planes, each of said bases further including a centrally disposed flexible tongue respectively in adjustable engagement with differential pressure elements, measuring means secured thereto, each of said forks being yieldingly connected to an aforesaid tongue, and a spherical weight disposed within said forks, the diameter of said weight being just sufficient to freely slidably engage both prongs of each of the aforesaid forks.

2. In an instrument adapted to be secured to a body whose motion is under observation, a rectangular frame, three measuring units fixed to three sides of said frame, said measuring units comprising bases pivotally supporting two like forks normal to their face planes and a third fork in predetermined arrangement with respect thereto, each of said bases further including a centrally disposed flexible tongue respectively in adjustable engagement with differential pressure elements, measuring means secured thereto, each of said forks being yieldingly connected to an aforesaid tongue, and a spherical weight disposed within said forks, the diameter of said weight being just sufficient to freely slidably engage both prongs of each of the aforesaid forks.

3. In an instrument adapted to be secured to a body whose motion is under observation, a rectangular frame, three measuring units fixed to three sides of said frame, said measuring units comprising bases pivotally supporting two like forks normal to their face planes such that said planes and the fork axes of symmetry are normal and similarly supporting a third fork constructed and arranged to have its plane of symmetry within the axis of symmetry of said forks and its ends intersected by the axis of symmetry of said other fork, each of said bases further including a centrally disposed flexible tongue having the inboard portion thereof in engagement with the inner extremities of two sets of carbon piles, the outer extremities of which are in adjustable engagement with differential pressure elements fixed to said bases, each of said forks being yieldingly adjustably connected to an aforesaid tongue, and a spherical weight disposed within said forks, the diameter of said weight being just sufficient to freely slidably engage both prongs of each of the aforesaid forks.

4. In an instrument adapted to be secured to a body whose motion is under observation, a rectangular frame, three measuring units fixed to and symmetrically disposed about three sides of said frame, said measuring units comprising bases pivotally supporting two like forks normal to their face planes such that said planes and the fork axes of symmetry are normal and intersecting inboard of the tips of said forks which have parallel inner surfaces and similarly supporting a third fork constructed and arranged to have its plane of symmetry within the axis of symmetry of one of said forks and its parallel inner surfaces normal to and intersected by the axis of symmetry of said other fork, each of said bases further including a flexible tongue equally subdivided by a plane of symmetry of an aforesaid fork and having the inboard portion of said tongue in engagement with the inner extremities of two sets of carbon piles, the outer extremities of which are in adjustable engagement with differential pressure elements fixed to said bases, each of said forks being yieldingly adjustably connected to an aforesaid flexible tongue, and a spherical weight disposed within said forks, the diameter of said weight being just sufficient to freely slidably engage both prongs of each of the aforesaid forks.

MARSHALL A. SMITH, Jr.
FORD L. PRESCOTT.